United States Patent
Radu et al.

(10) Patent No.: US 7,032,955 B2
(45) Date of Patent: Apr. 25, 2006

(54) TRIM PANEL MODULE

(75) Inventors: Bogdan Radu, Dearborn, MI (US); John D. Youngs, Southgate, MI (US)

(73) Assignee: Lear Corporation, Southfield, MI (US)

( * ) Notice: Subject to any disclaimer, the term of this patent is extended or adjusted under 35 U.S.C. 154(b) by 90 days.

(21) Appl. No.: 10/849,646

(22) Filed: May 19, 2004

(65) Prior Publication Data

US 2005/0258665 A1    Nov. 24, 2005

(51) Int. Cl.
B60R 13/02    (2006.01)
(52) U.S. Cl. .................... 296/146.7; 296/1.08
(58) Field of Classification Search ............ 296/146.7, 296/146.5, 146.1, 191, 1.08
See application file for complete search history.

(56) References Cited

U.S. PATENT DOCUMENTS

| | | | | |
|---|---|---|---|---|
| 5,111,619 A | * | 5/1992 | Billin et al. ................... | 49/502 |
| 5,127,191 A | * | 7/1992 | Ohta .............................. | 49/62 |
| 5,345,721 A | * | 9/1994 | Stein et al. .................... | 49/502 |
| 5,379,553 A | * | 1/1995 | Kimura et al. ................. | 49/502 |
| 5,446,999 A | * | 9/1995 | Inaba et al. .................... | 49/502 |
| 5,577,794 A | * | 11/1996 | Gandhi et al. ............ | 296/146.6 |
| 5,884,434 A | * | 3/1999 | Dedrich et al. ............... | 49/503 |
| 5,931,682 A | * | 8/1999 | Takiguchi et al. ............. | 439/34 |
| 6,035,601 A | * | 3/2000 | Yamaguchi et al. ..... | 52/784.16 |
| 6,119,406 A | | 9/2000 | Gulisano et al. | |
| 6,123,385 A | | 9/2000 | Bailey et al. | |
| 6,142,556 A | * | 11/2000 | Tanaka et al. ........... | 296/146.7 |
| 6,196,607 B1 | * | 3/2001 | Gulisano .................... | 296/39.1 |
| 6,381,906 B1 | * | 5/2002 | Pacella et al. ................ | 49/502 |
| 6,412,852 B1 | * | 7/2002 | Koa et al. ................ | 296/146.7 |
| 6,510,657 B1 | * | 1/2003 | Bertolini et al. .............. | 49/502 |
| 6,546,674 B1 | * | 4/2003 | Emerling et al. ............. | 49/502 |
| 6,626,482 B1 | * | 9/2003 | Barr et al. ................ | 296/146.7 |
| 6,676,324 B1 | * | 1/2004 | Pleiss ......................... | 403/33 |
| 6,767,049 B1 | * | 7/2004 | Morrison et al. ........ | 296/146.7 |
| 6,929,309 B1 | * | 8/2005 | Radu et al. ............... | 296/146.7 |
| 2003/0011209 A1 | * | 1/2003 | Berta et al. .............. | 296/146.7 |
| 2003/0039793 A1 | | 2/2003 | Tilton et al. | |
| 2003/0111865 A1 | * | 6/2003 | Barr et al. ................ | 296/146.7 |
| 2003/0230044 A1 | | 12/2003 | Peterson | |

* cited by examiner

Primary Examiner—H. Gutman
(74) Attorney, Agent, or Firm—Brooks Kushman P.C.

(57) ABSTRACT

A trim panel module for a vehicle. The trim panel module includes a carrier and a trim panel. The carrier has first and second attachment members. The trim panel has first and second mating members configured to engage the first and second attachment members. The trim panel is movable between a first position in which the first mating member and the first attachment member are engaged and a second position in which the first mating member and the first attachment member are disengaged to allow the trim panel to pivot with respect to the carrier.

20 Claims, 3 Drawing Sheets

TRIM PANEL MODULE

BACKGROUND OF THE INVENTION

1. Field of the Invention

The present invention relates to a trim panel module for a vehicle.

2. Background Art

Previously, interior trim panels were directly attached to structural vehicle components, such as the sheet metal body of a vehicle door. Attachment was made with a bracket as described in U.S. Pat. No. 6,123,385 or a fastener assembly as described in U.S. Pat. No. 6,813,865.

SUMMARY OF THE INVENTION

According to one aspect of the present invention, a trim panel module for a vehicle having a mounting surface is provided. The trim panel module includes a carrier and a trim panel. The carrier has first and second attachment members and is mountable on the mounting surface. The trim panel has first and second mating members configured to engage the first and second attachment members. The trim panel is movable between a first position in which the first mating member and the first attachment member are engaged and a second position in which the first mating member and the first attachment member are disengaged to allow the trim panel to pivot with respect to the carrier.

The first mating member may be shorter than the second mating member. The first attachment member may be shorter than the second attachment member.

The second attachment member may include a guide track. The second mating member may include a protrusion adapted to slidingly engage the guide track. The guide track may include a notch adapted to receive the protrusion. The notch and protrusion may cooperate to allow the trim panel to pivot with respect to the carrier.

The carrier may include a flange portion. A seal adapted to compress against the mounting surface may be disposed on the flange portion. The carrier may include a cavity adapted to receive at least one component. The cavity may be accessible when the trim panel is pivoted with respect to the carrier.

According to another aspect of the present invention, a trim panel module for a vehicle closure having first and second openings is provided. The trim panel module includes a carrier and a trim panel. The carrier is adapted to attach to the vehicle closure and includes a protruding portion, a hook, and first and second attachment members. The protruding portion is configured to fit within the first opening. The hook is disposed proximate the protruding portion. The trim panel has first and second mating members configured to engage the first and second attachment members. The carrier is moved in a first direction to position the protruding portion in the first opening and is then moved in a second direction to secure the hook to the vehicle closure.

The carrier may include a latch assembly disposed proximate the protruding portion that is positionable within the second opening when the carrier is moved in the second direction. The carrier may also include an exterior surface and a window carrier assembly disposed on the exterior surface.

According to another aspect of the present invention, a trim panel module for a door of a vehicle is provided. The trim panel module includes a carrier and a trim panel. The carrier includes a protruding portion, a flange portion, and first and second attachment members. The flange portion is disposed proximate the protruding portion and is configured to attach to the door. The first attachment member is shorter than the second attachment member. The trim panel includes a first surface, a second surface, and first and second mating members. The first surface is configured to face toward an interior of the vehicle. The second surface is disposed opposite the first surface. The first and second mating members extend from the second surface. The first and second attachment members engage the first and second mating members when the trim panel is in an installed position. The first attachment member and first mating member are disengaged when the trim panel is in a pivot position to permit the trim panel to pivot with respect to the carrier.

The first and second attachment members may have a male configuration. The first and second mating members may have a female configuration.

The second mating member may have a protrusion. The second attachment member may have a guide track configured to slidingly receive the protrusion when the trim panel is moved toward the installed position. The guide track may include a notch adapted to receive the protrusion and allow the trim panel to pivot. The second attachment member may include a retaining track disposed adjacent to and spaced apart from the guide track. The guide and retaining tracks cooperate to direct the protrusion when the trim panel is moved toward the installed position.

DETAILED DESCRIPTION OF THE PREFERRED EMBODIMENT(S)

Figure 1:
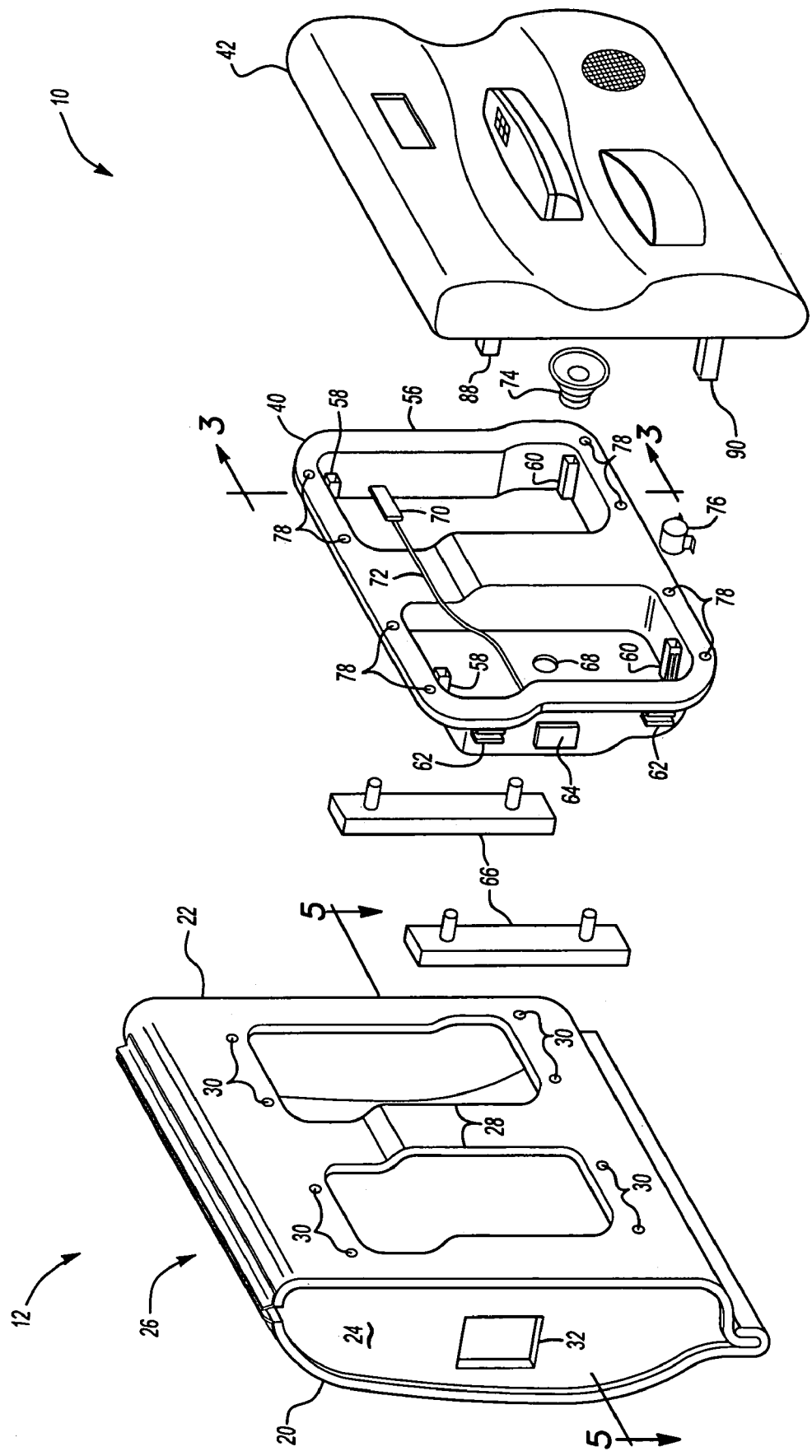
FIG. 1 is an exploded perspective view of a trim panel module and a vehicle closure.

Referring to FIG. 1, a trim panel module 10 for a vehicle is shown. In one embodiment, the trim panel module 10 is incorporated with a vehicle closure 12, such as a door or hatchback. However, the trim panel module 10 may be incorporated with any suitable vehicle component, such as an instrument panel.

The vehicle closure 12 includes an outer panel 20, an inner panel 22, and an end panel 24. The outer panel 20, inner panel 22 and end panel 24 may be made of any suitable material, such as fiberglass, a polymeric material, or a metal like steel or aluminum. Optionally, the vehicle closure 12 may also include a slot 26 disposed adjacent to the outer and inner panels 20,22 that is adapted to permit a window to be raised and lowered.

The outer panel 20 may form an exterior vehicle surface and may have any suitable configuration.

The inner panel 22 is disposed opposite the outer panel 20. The inner panel 22 may include one or more openings 28. In addition, the inner panel 22 may also include one or more holes 30 that facilitate attachment of the trim panel module 10 to the vehicle closure 12.

The end panel 24 is disposed between the outer panel 20 and the inner panel 22. The end panel 24 may include a latch opening 32 adapted to receive a latch assembly.

The trim panel module 10 includes a carrier 40 and a trim panel 42. The carrier 40 and trim panel 42 are adapted to be selectively coupled and decoupled. The carrier 40 and trim panel 42 may be manufactured as separate components and then assembled into the trim panel module 10 prior to shipment to a vehicle assembly plant.

The carrier 40 may have a first surface 50, a second surface 52, one or more protruding portions 54, a flange portion 56, an upper attachment member 58, and a lower attachment member 60. The carrier 40 may also include one or more hooks 62, a latch assembly 64, a window carrier 66, and one or more connection apertures 68. The carrier 40 may create separate "wet" and "dry" regions as will be discussed in more detail below.

In the embodiment shown, the first surface 50 is disposed proximate the trim panel 42. The second surface 52 is disposed opposite the first surface 50.

The protruding portions 54 may extend opposite the trim panel 42. More specifically, the protruding portions 54 may be configured to provide a cavity that receives one or more components, such as a handle 70, cable 72, speaker 74, window regulator 76, and/or wiring.

The flange portion 56 is disposed proximate the protruding portion 54. The flange portion 56 may be configured to be attached to the vehicle closure 12 in any suitable manner. For example, the flange portion 56 may include one or more apertures 78 configured to align with the holes 30 in the inner panel 22 to allow a fastener to be inserted therein.

Figure 2:
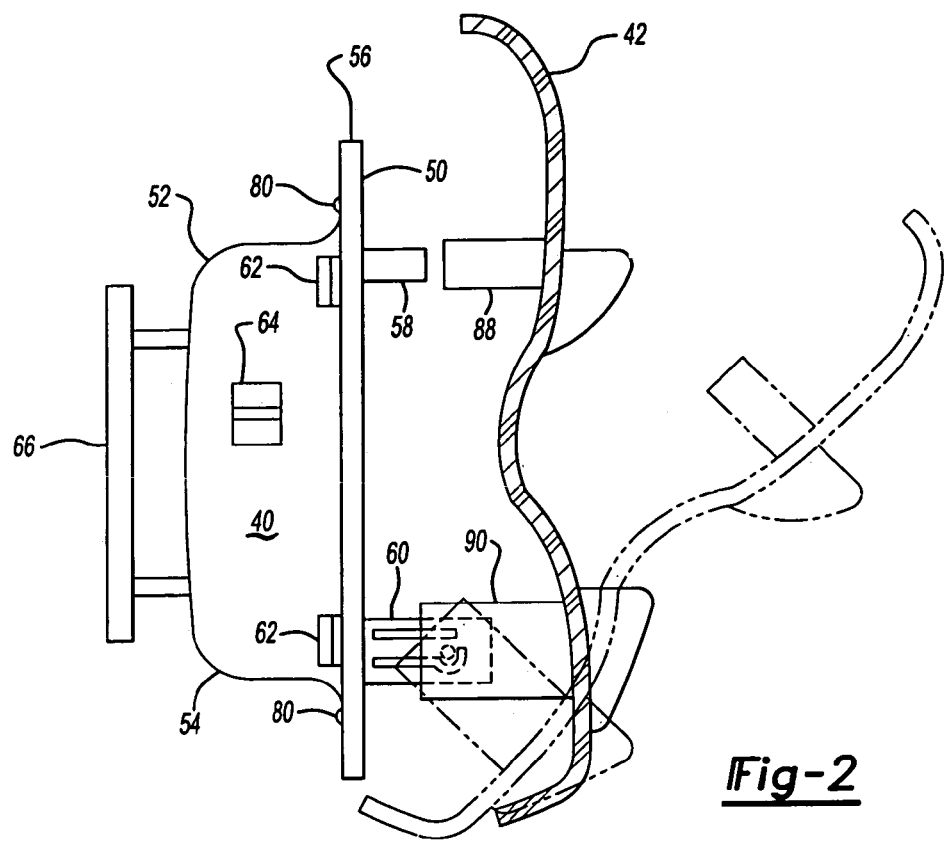
FIG. 2 is a side view of the trim panel module.
Figure 3:
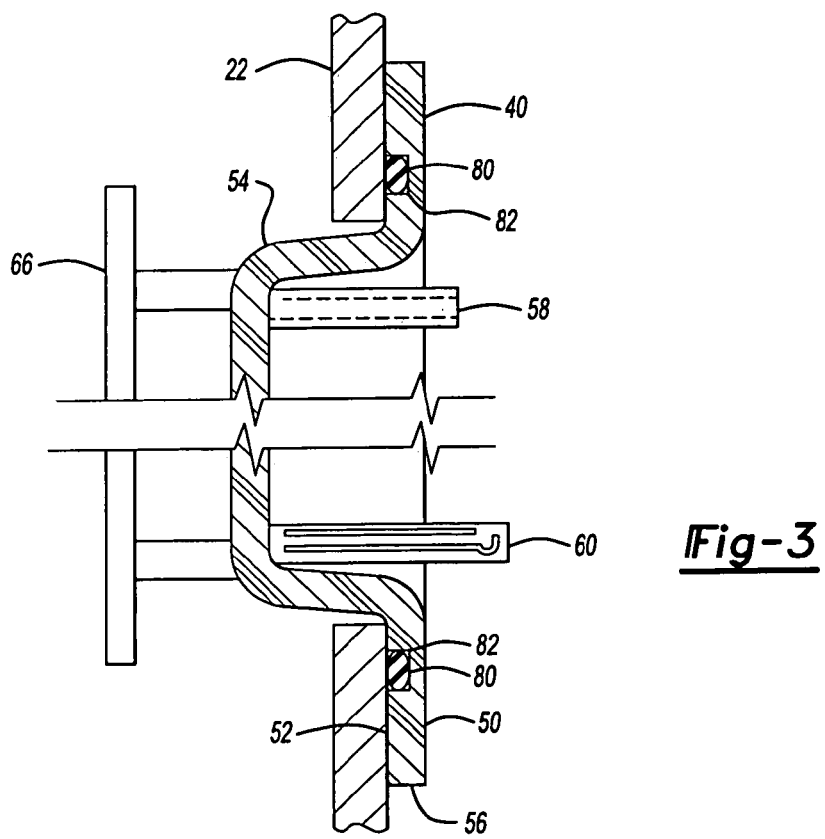
FIG. 3 is a section view of the trim panel module.

Referring to FIGS. 2 and 3, the flange portion 56 is shown in more detail. A seal 80 may be disposed on the second surface 52. Optionally, the seal 80 may be disposed in a groove 82 disposed in the flange portion 56. The seal 80 is adapted to inhibit water leakage from the vehicle closure 12 into the cavity formed by the protruding portions 54. The seal 80 may be made of any suitable material, such as an epoxy or other elastomeric material like rubber or EPDM (ethylene propylene diene terpolymer).

The hooks 62 are adapted to help attach the carrier 40 to the vehicle closure 12. The hooks 62 may have any suitable configuration and may be disposed in any suitable location. In the embodiment shown, the hooks 62 are disposed on the second surface 52 proximate the flange portion 56 and are adapted to secure the carrier 40 to the inner panel 22. Any suitable number of hooks may be employed.

The latch assembly 64 is configured to secure the vehicle closure 12 in a closed position. More specifically, the latch assembly 64 engages a strike disposed on the vehicle to secure the closure. The latch assembly 64 may have any suitable configuration and may be disposed in any suitable position. In the embodiment shown in FIG. 1, the latch assembly 64 is disposed proximate the protruding portion 54 and is positionable within the latch opening 32. The latch assembly may be operatively connected to the handle 70 by cable 72.

The window carrier 66 is configured to movably support a window. In the embodiment shown, the window carrier 66 is disposed on the second surface 52 proximate the protruding portion 54. The window carrier 66 may be actuated by the window regulator 76 as known by those skilled in the art.

The connecting apertures 68 facilitate electrical and/or mechanical connections between components. The connecting apertures 68 may be sealed to inhibit moisture.

The upper and lower attachment members 58,60 facilitate connection of the trim panel 42 to the carrier 40. The upper and lower attachment members 58,60 may have any suitable configuration. For example, the attachment members 58,60 may have a male or female configuration. Moreover, the attachment members 58,60 may have any suitable shape. The attachment members may be tubular or solid. In addition, the attachment members may have any suitable geometry. For example, the attachment members 58,60 may have a continuous cross-section or may have a tapered or conical shape. In addition, the attachment members may have any suitable length. In the embodiment shown, the upper attachment members 58 are shorter than the lower attachment members 60.

Any suitable number of upper and lower attachment members 58,60 may be employed. In the embodiment shown, there are two upper attachment members 58 and two lower attachment members 60.

The upper and lower attachment members 58,60 may be disposed in any suitable location. In the embodiment shown, the upper and lower attachment members 58,60 extend from the protruding portion 54. However, the upper and lower attachment members may be disposed anywhere on the first surface 50.

The attachment members may be integrally formed with the carrier 40 or may be separate components attached in any suitable manner, such as with an adhesive, fasteners, or heat staking.

The trim panel 42 is configured to face toward the interior of the vehicle. More specifically, the trim panel 42 includes a front surface configured to face toward the interior of the vehicle and a back surface disposed opposite the front surface. The trim panel 42 may include various features and trim surfaces, such as an arm rest, door handle, lock and/or window controls, a speaker grill, and one or more storage compartments.

The trim panel 42 may include one or more mating members 88,90. The mating members 88,90 are configured to engage the attachment members 58,60, respectively. The mating members may have any suitable configuration and orientation. In the embodiment shown, the mating members 88,90 are generally disposed in a horizontal configuration. Alternatively, the mating members 88,90 may be disposed at any suitable angle. The mating members 88,90 may have a male or female configuration. The mating members 88,90 may have any suitable length. In the embodiment shown, the upper mating members 88 are shorter than the lower mating members 90 to permit the trim panel 42 to pivot as will be discussed below. In addition, the lower mating members 90 may be located where there is a large gap between the back surface of the trim panel and the first surface 50 of the carrier 40.

Any suitable number of upper and lower mating members 88,90 may be employed. In the embodiment shown, there are two upper mating members 88 and two lower mating members 90.

The upper and lower mating members 88,90 may be disposed in any suitable location. In the embodiment shown, the mating members 88,90 extend from the back surface of the trim panel 42.

The mating members 88,90 may be integrally formed with the trim panel 42 or may be separate components attached in any suitable manner, such as with an adhesive, fasteners, or heat staking.

Figure 4:
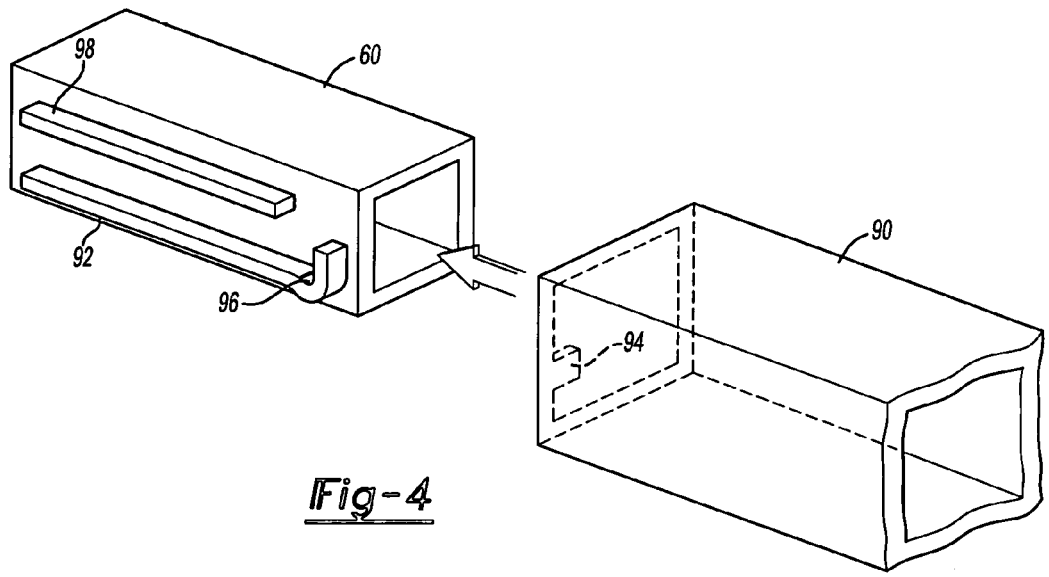
FIG. 4 is a perspective view of one embodiment of an attachment member and a mating member of the trim panel module.

Referring to FIG. 2, a cross-section of the trim panel module 10 is shown. In this embodiment, the trim panel 42 is shown in a pivot position. More specifically, the trim panel 42 is shown such that the upper trim panel attachment member 88 disengages from the upper carrier attachment member 58 and the lower trim panel attachment member 90 is pivotally attached to the lower carrier attachment member 60. The lower carrier attachment member 60 includes a guide track or first guide rail 92. The first guide rail 92 is configured to receive a boss or protrusion 94 on the lower trim panel attachment member 90 as is best shown in FIG. 4. The first guide rail 92 includes a notch 96 disposed at one end. The notch 96 is configured to receive the protrusion 94 and allow the trim panel 42 to pivot between an upright position and the pivot position as shown in phantom. When the trim panel 42 is in the pivot position, the components disposed in the carrier 40 may be accessed without removing the carrier 40 from the vehicle closure 12. The lower attachment member 60 on the carrier 40 may also include a retaining track or second guide rail 98. The second guide rail 98 is disposed substantially parallel to the first guide rail 92 and spaced apart from the first guide rail 92. The first and second guide rails 92,98 cooperate to allow the trim panel 42 to slide along the lower attachment member 60. More particularly, the protrusion 94 on the lower trim panel attachment member 90 slides between the first and second guide rails 92,98.

When the trim panel 42 is slid against toward the carrier 40, the upper attachment members 58,88 engage. When the trim panel 42 is fully seated against the carrier 40, the trim panel 42 is in a normal installed position. The attachment members 58,88 may have an interference fit that secures the trim panel 42 to the carrier 40.

Referring to FIG. 3, a cross-section of the carrier 40 is shown installed on the inner panel 22. More particularly, the flange portion 56 is seated against the inner panel 22 and the seal 80 is at least partially compressed to inhibit water ingression into the protruding portion 54. This configuration allows components such as the window regulator motor and electronics to be disposed in a location where water entering the door panel will not affect component performance.

Figure 5A:
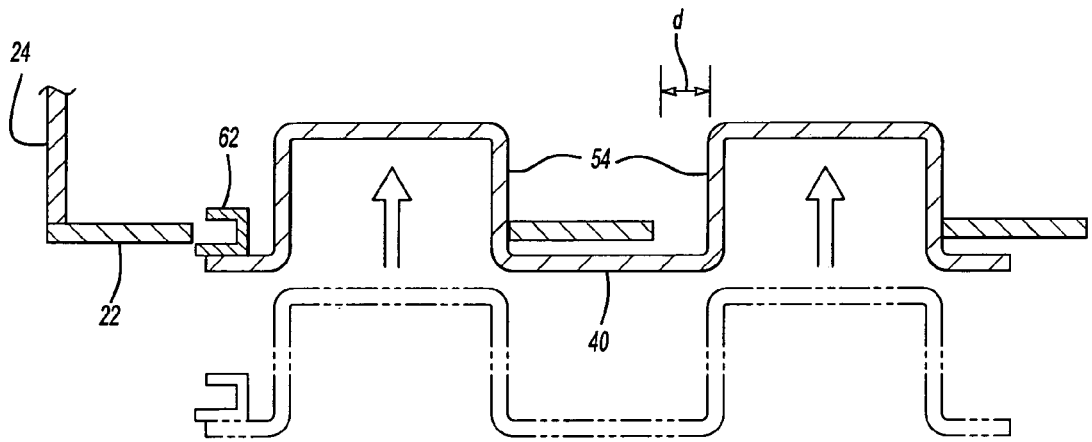
FIG. 5A is a section view of the trim panel module moving in a first direction during installation on the vehicle closure.
Figure 5B:
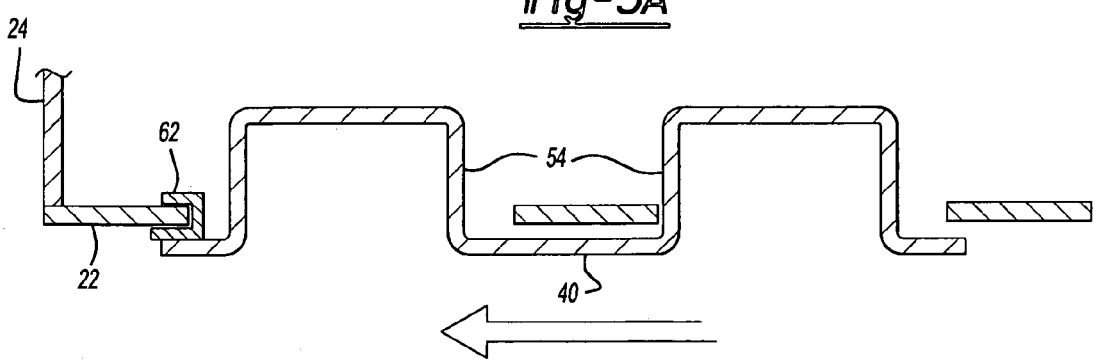
FIG. 5B is a section view of the trim panel module moving in a second direction during installation on the vehicle closure.

Referring to FIGS. 5A and 5B, installation of the trim panel module is shown in more detail. For clarity, the trim panel module is depicted without the trim panel.

Referring to FIG. 5A, the carrier 40 is shown during installation. More particularly, the carrier 40 is disposed proximate the inner panel 22 such that the protruding portion 54 extends into the opening by moving the carrier 40 in a first direction. When the carrier 40 is moved in the first direction, the hook 62 is also disposed in the opening 28 but does not engage the inner panel 22. The carrier 40 is configured such that the protruding portion 54 is smaller than the opening 28. In the embodiment shown in FIG. 5A, clearance is depicted by the distance designated with a letter d. After the carrier 40 has been moved in a first direction, the carrier 40 is then moved in a second or lateral direction to allow the hook 62 to engage the inner panel 22 as shown in FIG. 5B. More particularly, in FIG. 5B, the carrier 40 is moved to the left to allow the hook 62 to engage the inner panel 22. The hook 62 helps secure the trim panel module 10 to the vehicle closure 12 and to retain the carrier 40 regardless of the position of the trim panel 42. The carrier 40 allows components to be mounted in wet and dry areas. More particularly, the components mounted along the second surface 52 are located in a wet area while components mounted proximate the protruding portion are located in a dry area.

The trim panel module improves serviceability of components since the components disposed in the protruding portion may be accessed without removing the carrier and without removing the window. The trim panel module also allows a complete trim panel assembly with supporting components and electronics to be provided in an integrated module. The use of such an integrated module reduces the need for an additional door panel or door module assembly line at a vehicle assembly plant. The integrated trim panel module also eliminates the associated handling of separate components, it improves quality since the module may be assembled and tested independent of the vehicle and also provides for easier installation since multiple components may be installed as one assembly. The module also elimates the need for individual seals on door module components and the associated costs with the additional seals.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim panel module for a vehicle having a mounting surface, the trim panel module comprising:
   a carrier having first and second attachment members and mountable on the mounting surface; and
   a trim panel having first and second mating members configured to engage the first and second attachment members, respectively;
   wherein the first attachment member is shorter than the second attachment member; and
   wherein the trim panel is movable between a first position in which the first mating member and the first attachment member are engaged and a second position in which the first mating member and the first attachment member are disengaged to allow the trim panel to pivot with respect to the carrier.

2. The trim panel module of claim 1 wherein the first mating member is shorter than the second mating member.

3. The trim panel module of claim 1 wherein the carrier further comprises a protruding portion that extends through an opening in the mounting surface.

4. The trim panel module of claim 1 wherein the second attachment member further includes a guide track and the second mating member includes a protrusion adapted to slidingly engage the guide track.

5. The trim panel module of claim 4 wherein the guide track further comprises a notch adapted to receive the protrusion, the notch and protrusion cooperating to allow the trim panel to pivot with respect to the carrier.

6. The trim panel module of claim 1 wherein the carrier further includes a cavity adapted to receive at least one component and accessible when the trim panel is pivoted with respect to the carrier.

7. The trim panel module of claim 1 wherein the carrier further comprises a flange portion and a seal disposed on the flange portion adapted to compress against the mounting surface.

8. A trim panel module for a vehicle closure having first and second openings, the trim panel module comprising:
   a carrier adapted to attach to the vehicle closure, the carrier including:
      a protruding portion configured to fit within the first opening;
      a hook disposed proximate the protruding portion; and
      first and second attachment members; and a trim panel having first and second mating members configured to engage the first and second attachment members, respectively;

wherein the carrier is moved in a first direction to position the protruding portion in the first opening and then moved in a second direction to secure the hook to the vehicle closure.

9. The trim panel module of claim 8 wherein the carrier further has a latch assembly disposed proximate the protruding portion and positionable within the second opening when the carrier is moved in the second direction.

10. The trim panel module of claim 8 wherein the carrier further has an exterior surface disposed adjacent to the vehicle closure and a window carrier assembly disposed on the exterior surface.

11. The trim panel module of claim 10 wherein the hook is disposed proximate the exterior surface.

12. The trim panel module of claim 8 wherein the first and second attachment members are disposed proximate the protruding portion.

13. The trim panel module of claim 8 wherein the carrier further comprises a flange portion disposed proximate the protruding portion.

14. The trim panel module of claim 13 wherein the carrier further comprises a seal disposed on the flange portion that compresses against the vehicle closure.

15. A trim panel module for a door of a vehicle, the trim panel module comprising:
a carrier including:
  a protruding portion;
  a flange portion disposed proximate the protruding portion, the flange portion being configured to attach to the door; and
  first and second attachment members, the first attachment member being shorter than the second attachment member; and
a trim panel including:
  a first surface configured to face toward an interior of the vehicle;
  a second surface disposed opposite the first surface; and
  first and second mating members extending from the second surface;
wherein the first and second attachment members engage the first and second mating members, respectively, when the trim panel is in an installed position and the first attachment member and first mating member are disengaged when the trim panel is in a pivot position to permit the trim panel to pivot with respect to the carrier.

16. The trim panel module of claim 15 wherein the flange portion further comprises a mating surface configured to contact the door and a seal disposed on the mating surface.

17. The trim panel module of claim 15 wherein the first and second attachment members have a male configuration and the first and second mating members have a female configuration.

18. The trim panel module of claim 15 wherein the second mating member further has a protrusion and the second attachment member further has a guide track configured to slidingly receive the protrusion when the trim panel is moved toward the installed position.

19. The trim panel module of claim 18 wherein the guide track further includes a notch adapted to receive the protrusion and allow the trim panel to pivot when the trim panel is in the pivot position.

20. The trim panel module of claim 18 wherein the second attachment member further includes a retaining track disposed adjacent to and spaced apart from the guide track, the guide and retaining tracks cooperating to direct the protrusion when the trim panel is moved toward the installed position.

* * * * *